United States Patent Office 3,484,401
Patented Dec. 16, 1969

3,484,401
ADDITIVES FOR PREVENTING THE FLOW OF POLYESTER MOULDING AND COATING COMPOSITIONS
Hans Rudolph and Klaus Prater, Krefeld-Bockum, Germany, assignors to Farbenfabriken Bayer Aktiengesellschaft, Leverkusen, Germany, a corporation of Germany
No Drawing. Filed Jan. 10, 1967, Ser. No. 608,272
Claims priority, application Germany, Feb. 5, 1966, F 48,360
Int. Cl. C08g 17/14; C09d 3/46
U.S. Cl. 260—22
4 Claims

ABSTRACT OF THE DISCLOSURE

Addition of cyclohexylamides of saturated higher fatty acids to polyester moulding and coating compositions to favorably influence the flow behavior thereof.

---

During the application of liquid, hardening polyester moulding and coating compositions to vertical or sloping surfaces it is desirable that flowing off of the compositions should, as far as is possible, not occur. As is known, the flow behaviour can be influenced in the desired manner by adding finely powdered insoluble inorganic substances, e.g., highly dispersed silicic acid. Such additives, however, have the disadvantage that they impair the properties of the shaped parts and coatings prepared from the polyester moulding compositions with hardening. In particular, the mechanical strength decreases considerably.

As is known, the flow behaviour of polyester moulding and coating compositions can also be corrected in similar manner by the incorporation of polyester amides or ethoxylated polyamides. In order to achieve uniform products, these high molecular weight additives must, however, be worked in at greatly elevated temperature. In this process, the moulding and coating compositions often undergo disadvantageous changes; in particular, colour and storage stability are impaired.

It has already been proposed (German patent specification No. 1,068,888) to use, for increasing the viscosity of liquid, unsaturated polyester moulding compositions, polymerisation products of vinyl lactams which can be introduced into the moulding compositions at room temperature. However, this method of working is also unsatisfactory for several reasons: the polymeric vinyl lactams are high molecular weight substances which can only in solid form be worked into the moulding compositions, i.e., by protracted stirring; moreover, the polyvinyl lactams only attain their full effectiveness after 3–4 days; furthermore, the products modified by polyvinyl lactams are practically incapable of being influenced in their flow behaviour by shearing stresses.

Surprisingly, it has now been found that the flow behaviour of polyester moulding and coating compositions can in extremely simple manner be influenced in the desired way by adding to them cyclohexylamides of higher saturated fatty acids.

The object of the invention is therefore the use of cyclohexylamides of saturated higher fatty acids as addition to polyester moulding and coating compositions.

The advantage of the use according to the invention of these amides consists in that they need only be admixed in molten form at only moderately elevated temperature with the unsaturated polyesters before the addition of the monomer or with the finished moulding and coating compositions. As a rule they can without any difficulty be dissolved therein by brief stirring. Impairment of the moulding and coating compositions when this is done is practically excluded. During cooling to room temperature, gel-like to pasty products are formed in dependence on the amount of amides added. The consistency of these products can be influenced by shearing forces (such as occur e.g., during application with a spray gun) in such a manner that machine treatment on vertical and sloping surfaces is possible without appreciable flow, let alone running-off. The properties of the shaped parts and coatings obtained from such polyester compositions are practically unimpaired by the additives.

Examples of the additives to be used according to the invention are the cyclohexylamides of saturated fatty acids with at least 50 carbon atoms, such as capric acid, lauric acid, myristic acid, palmitic acid, stearic acid, hydroxystearic acid and behenic acid, etc.

The amides may also be used in admixture with one another; thus, e.g., the cyclohexylamides of the so-called "main run" of paraffin oxidation, which contains to a considerable extent higher fatty acids with odd-numbered carbon contents, are also suitable. The amides can also be used is admixture with other known additives which influence the flow behaviour.

The effectiveness of the fatty acid cyclohexylamides is substantially dependent on the length of the fatty acid radical. If this is, e.g., longer than about 17 carbon atoms, even amounts of less than 1 percent by weight can produce gel-like consistency. Amides with shorter-chained radicals, however, are generally to be used in somewhat larger amounts, it possibly being necessary, e.g., to obtain pasty products, to admix with the polyester moulding and coating compositions amounts of up to about 10 percent by weight. As a rule, however, the additives will not be substantially less than 1 percent by weight and will not substantially exceed 5 percent by weight.

We have further found that the gel-like to pasty state of the polyester mixtures is reached particularly quickly and uniformly by the additional admixture of a small portion, for example, from about 1 to about 5% by weight, of a composition just having a decreased flowability to the mixture immediately after the cyclohexylamide of a higher fatty acid has been added and the mixture has been cooled.

Polyester moulding and coating compositions in the sense of the invention are, as is usual, solutions of unsaturated polyesters, i.e., of condensation products which contain, linked in ester-like manner, radicals of polyvalent, generally divalent, carboxylic acids and polyhydric, in most cases dihydric, alcohols with, possibly, in addition thereto, radicals of monovalent acids and/or radicals of monohydric alcohols and/or radicals of hydroxycarboxylic acids, it being essential that at least a part of the radicals must contain ethylenically unsaturated, polymerisable double bonds, in monomers capable of being introduced by polymerisation. Such polyesters, as well as the ethylenically unsaturated organic monomeric compounds capable of being introduced by polymerisation, are described in detail, e.g., in J. Bjorksten et al., "Polyesters and Their Applications" (Reinhold Publishing Corp., New York, 1956).

Examples of acids which may be used for the production of the unsaturated polyesters are, inter alia, maleic acid, fumaric acid, itaconic acid, mesaconic acid, citraconic acid, succinic acid, glutaric acid, adipic acid, phthalic acid, tetrachlorophthalic acid, hexachloroendomethylenetetrahydrophthalic acid, trimellitic acid, benzoic acid, linseed oil fatty acid and ricinoleic fatty acid. Examples of alcohols are, inter alia, ethylene glycol, diethylene glycol, propane-butane and hexane-diols, trimethylolpropane, pentaerythritol, butanol and tetrahydrofurfuryl alcohol.

There may also be mentioned moulding masses which, apart from the radicals of α,β-unsaturated dicarboxylic acids as components of the polyesters, also contain β,γ-unsaturated ether radicals, be it also as components of the polyester, for example, according to British patent specification No. 810,222, be it as components of further mixture components, for example, according to German patent specifications Nos. 1,067,210 and 1,081,222, which besides their copolymerizability, are, at the same time, air-drying.

As copolymerizable monomeric compounds, there are also suitable the unsaturated compounds usual in polyester technology with vinyl groups which may be substituted in the α-position or allyl groups which may be substituted in the β-position, such as styrene, vinyl-toluene, divinyl-benzene, vinyl acetate, acrylic acid and its esters, acrylonitrile, methacrylic acid and its corresponding derivatives, as well as allyl esters, such as allyl acetate, allyl acrylate, phthalic acid diallyl ester, triallyl phosphate and triallyl cyanurate.

The polyester moulding and coating compositions may contain, as a rule, known inhibitors, such as, p-benzoquinone, 2,5-di-tert.-butyl-quinone, hydroquinone, tert.-butyl-pyrocatechol and 4-ethyl-pyrocatechol, as well as copper compounds and hydroxylamine derivatives.

The moulding and coating compositions may also contain all the additives known from the art, e.g., magnesium oxide, chalk, ground shale, barite, talcum, dyestuffs, fabrics or fibres of glass, plastics or textile products, compounds which afford protection against light, heat or burning, etc.

Before using the moulding and coating compositions a polymerization catalyst, for example, an organic peroxide, such as a diacyl peroxides, for instance benzoyl peroxide and the like, or a hydroperoxide, such as methylethyl ketone hydroperoxide and cyclohexanone hydroperoxide, and an accelerator, for example, a tertiary aromatic amine such as dimethylaniline, or a cobalt drier, are admixed to the compositions. Thereafter, the compositions are ready to be worked up in usual manners.

EXAMPLE 1

0.12 part by weight hydroquinone is added to an unsaturated polyester (prepared by condensation of 112 parts by weight phthalic anhydride, 293 parts by weight maleic anhydride, 100 parts by weight ethyleneglycol and 202 parts by weight 1,3-butyleneglycol) and the mixture is dissolved in styrene to give a 65% solution. To 200 parts by weight of this polyester moulding composition having a temperature of 80° C. there is admixed 0.8 part by weight stearic acid cyclohexylamide in molten form. After cooling to room temperature, a gel-like mass is obtained. To 100 parts by weight of this mass there are added 4 parts by weight dimethylaniline solution (10% in dimethylphthalate), and to a further 100 parts by weight of this mass 6 parts by weight of benzoyl peroxide paste are added. The mixtures thus obtained can, with conventional two-component spraying devices, be applied to vertical surfaces and harden there without appreciable running off. Quite similar results are arrived at when the cyclohexylamide is admixed with the unsaturated polyester before addition of the monomer.

EXAMPLE 2

To 100 parts by weight of the molding composition described in Example 1 there are admixed at 80° C. 4 parts by weight stearic acid cyclohexylamide in molten form. After cooling to room temperature, a mass of unctuous consistency is obtained which, after addition of 1 part by weight dimethylaniline solution (10%) and 3 parts by weight benzoyl peroxide paste, can be used as hardening filler composition.

EXAMPLE 3

To 100 parts by weight of the moulding composition described in Example 1 there are added at 70° C. 8 parts by weight lauric acid cyclohexylamide in molten form. A mass which is very pasty at room temperature is obtained which, after 1 part by weight cobalt naphthenate solution (20% in toluene) and 2.5 parts by weight methylethylketonehydroperoxide (40% solution) have been worked into it, can be used for the preparation of fine layers on vertical or sloping surfaces.

EXAMPLE 4

0.7 part by weight of stearic acid cyclohexyl amide in molten form is admixed at 80° C. with 200 parts by weight of a polyester solution in styrene according to Example 1. The mass is cooled to 25° C. with continuously stirring. 4 parts by weight of the gelatinized mass of Example 1 are subsequently added with further stirring. The material thus inoculated is instantaneously converted into a gel-like mass of excellent homogeneity.

We claim:
1. A polyester composition comprising a mixture of (1) a solution of an unsaturated polyester which comprises the condensation product of a polybasic carboxylic acid and a polyhydric alcohol, at least a portion of said condensation reactants containing ethylenically unsaturated, polymerizable double bonds, in an ethylenically unsaturated monomeric compound copolymerizable with said unsaturated polyester and (2) a cyclohexylamide of a saturated higher fatty acid having at least 10 carbon atoms.

2. The polyester composition of claim 1 wherein the content of said cyclohexylamide is from about 1 to about 10% by weight.

3. The polyester composition of claim 1 wherein said cyclohexylamide is stearic acid cyclohexylamide.

4. The polyester composition of claim 1 wherein said cyclohexylamide is lauric acid cyclohexylamide.

References Cited

UNITED STATES PATENTS

| | | | |
|---|---|---|---|
| 2,414,427 | 1/1947 | Zurcher | 260—22 |
| 2,772,174 | 11/1956 | Riegler et al. | 260—22 |
| 3,254,040 | 5/1966 | Aronoff et al. | 260—22 |
| 3,309,327 | 3/1967 | Gayer | 260—22 |
| 3,340,218 | 9/1967 | Magne et al. | 260—32.6 |
| 3,366,563 | 1/1968 | Hart et al. | 204—181 |

DONALD E. CZAJA, Primary Examiner

R. W. GRIFFIN, Assistant Examiner

U.S. Cl. X.R.

117—161, 167; 260—23, 32.6, 40, 864